United States Patent [19]
Xu et al.

[11] Patent Number: 5,255,837
[45] Date of Patent: Oct. 26, 1993

[54] COIL LEAP LAP JOINT FOR SUPERCONDUCTING MAGNET

[75] Inventors: Bu X. Xu; Granville G. Ward; Winfield S. DeWitt, III, all of Florence; Gerhard S. Kobus, Effingham; Craig C. Duer; Jimmy L. Turner, both of Florence, all of S.C.

[73] Assignee: General Electric Company, Milwaukee, Wis.

[21] Appl. No.: 923,426

[22] Filed: Aug. 3, 1992

[51] Int. Cl.$^5$ ............................ B23K 1/00; B23K 1/19
[52] U.S. Cl. .................................... 228/102; 228/212; 228/224; 228/251; 228/179.1; 228/233.2; 505/927
[58] Field of Search ............... 228/102, 179, 205, 212, 228/224, 239, 247, 251, 5.7; 505/924–927; 29/599

[56] References Cited
U.S. PATENT DOCUMENTS

| | | | |
|---|---|---|---|
| 3,699,647 | 10/1972 | Bidault et al. | 228/5.1 |
| 4,236,297 | 12/1980 | Lanig | 505/921 |
| 4,530,812 | 7/1985 | Perkins et al. | 376/133 |
| 5,004,361 | 4/1991 | Winnie | 411/366 |

OTHER PUBLICATIONS

IEEE Transactions on Magnetics, "Joining NbTi...", Hafstrom et al, No. 1, pp. 94–96, Jan. 1977.

*Primary Examiner*—Samuel M. Heinrich
*Attorney, Agent, or Firm*—Irving Freedman; James O. Skarsten

[57] ABSTRACT

A method of forming a long 100-inch low resistance lap joint suitable for joining magnet coils in a superconducting magnet assembly on the magnet drum, which is accomplished by forming a flat solder sandwich within a groove on the drum and moving a heat source along the lap joint with controlled temperature, pressure and rotational speed of the drum.

15 Claims, 2 Drawing Sheets

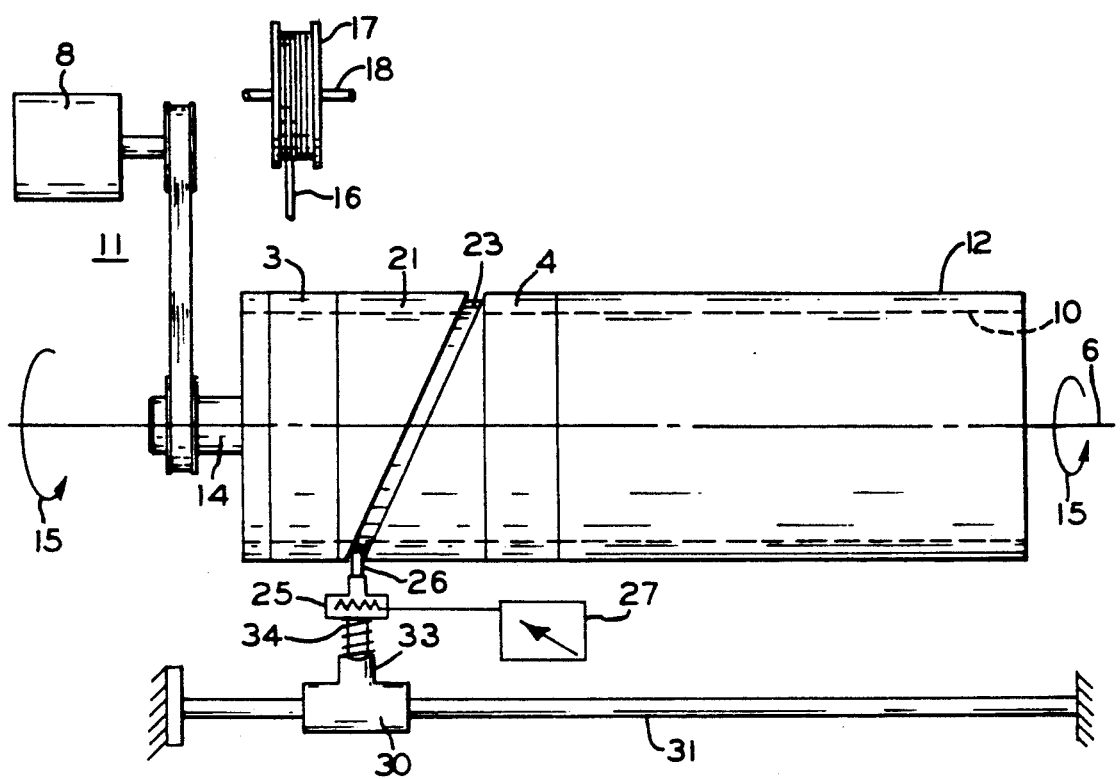
FIG_1
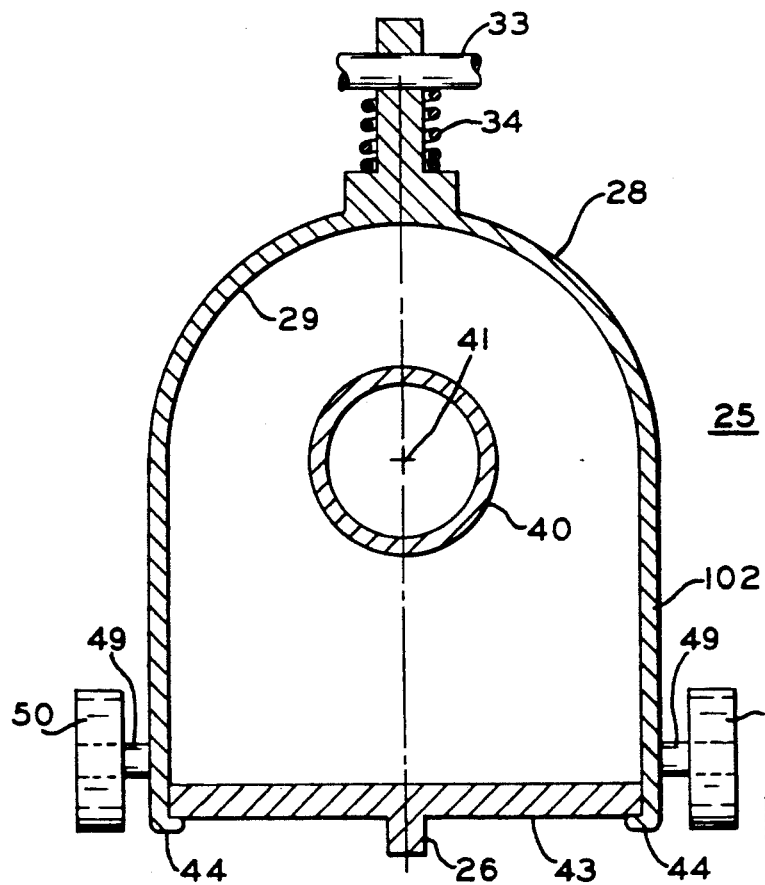
FIG_2

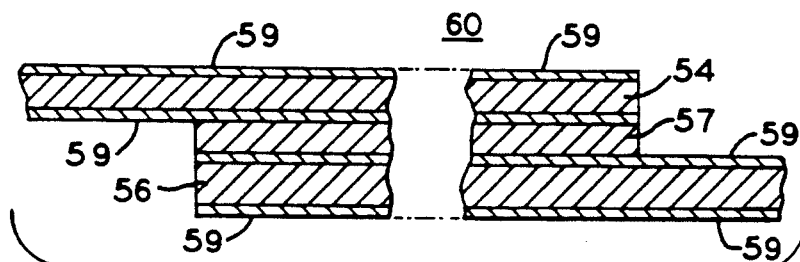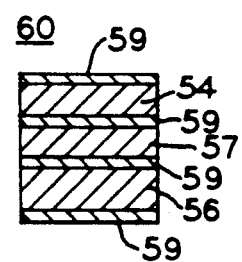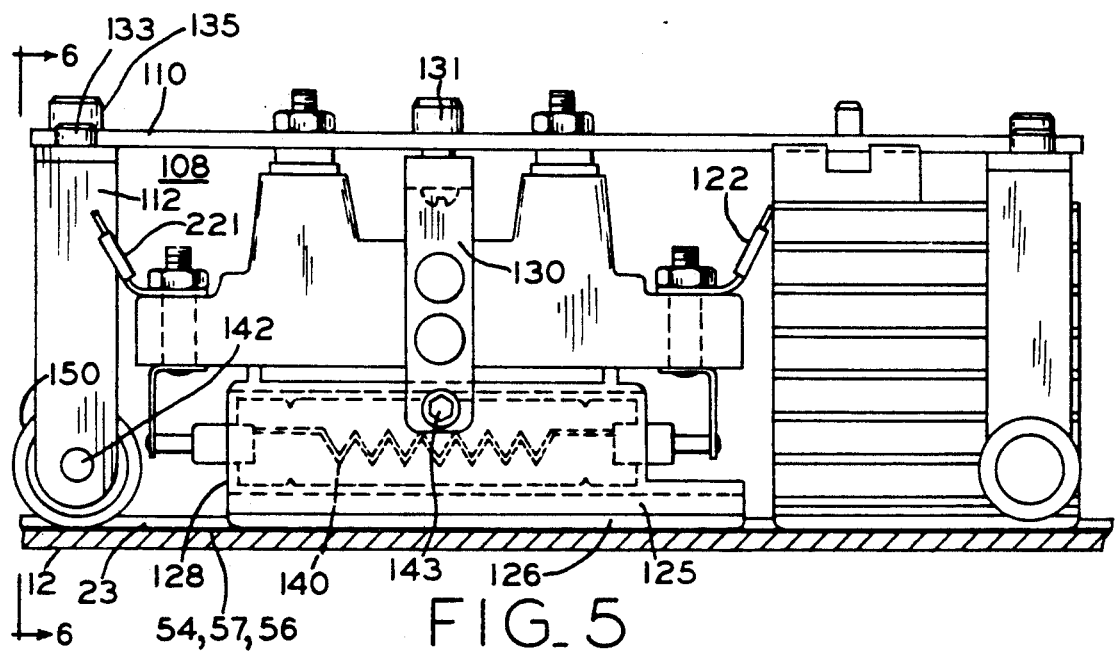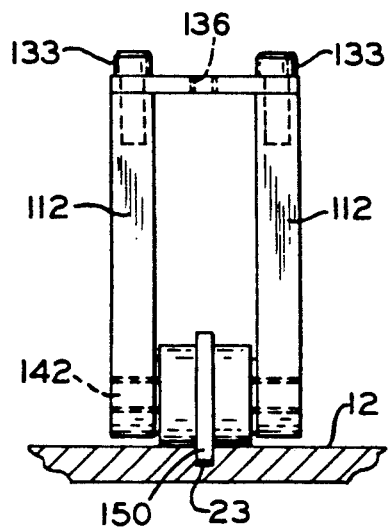

COIL LEAP LAP JOINT FOR SUPERCONDUCTING MAGNET

BACKGROUND OF THE INVENTION

This invention relates to low resistance lap joints for superconducting magnet coils, particularly suitable for main magnet coils.

As is well known, a magnet can be made superconductive by placing it in an extremely cold environment, such as by enclosing it in a cryostat or pressure vessel containing liquid helium or other cryogen. The extreme cold reduces the resistance in the magnet coils to negligible levels, such that when a power source is initially connected to the coil (for a period, for example, of ten minutes) to introduce a current flow through the coils, the current will continue to flow through the coils due to the negligible resistance even after power is removed, thereby maintaining a magnetic field. Superconducting magnets find wide application, for example, in the field of magnetic resonance imaging (hereinafter "MRI").

The main magnet coils are wound on a composite drum, which in an MRI may have a circumference in the order of 150 inches. Thus, the magnet coils are relatively large and require a considerable length of wire or conductors. Moreover, in a typical MRI there are six different main magnet coils wound circumferentially around the outer surface of the drum and axially spaced from one another. These coils are connected in series and are normally wound by feeding the conductor off a supply reel while rotating the drum. Because of the superconducting temperatures (in the order of −270° C.) and the conflicting thermal, electrical, magnetic and mechanical considerations and factors which must be considered in an MRI design, the magnet coil conductor may be of relatively expensive material, such as niobium titanium (NbTi) or niobium tin ($Nb_3Sn$).

Because of the large size and axial length of the main magnet coils in an MRI superconducting magnet, it becomes necessary to electrically connect the coils in a series circuit. However, it is important that the connection or joint have a reliable uniform low resistance, in the order of less than $1 \times 10^{-10}$ ohms. The principle of superconducting current flow is based on the absence of electrical resistance to the current flow at the superconducting temperatures. It is thus extremely important to keep the resistance of electrical connections or joints low. Even a single watt of heating can result in the boiling of 1.4 liters per hour of helium, which is completely unacceptable, since a typical MRI specification limits the helium boil-off to only 0.2 liters per hour. Moreover, MRI magnets are subject to drift if there is any appreciable resistance in the magnet circuit, and MRI drift rate specifications and requirements necessitate very low resistance. In addition, resistance must also be minimized to enable the MRI magnet to operate in the persistent mode and to avoid quenching of the magnetic field after it is initially ramped to field. A superconducting magnet ramping current may be as high as 750 amps. Still further, in placing a superconducting magnet into operation, the temperature of the magnet assembly must be reduced from ambient temperatures to superconducting temperatures, placing significant mechanical and thermal stresses on the magnet coils.

As a result, the superconducting magnet joints must withstand significant thermal, electrical, magnetic and mechanical stresses and factors which must be balanced and compromised in order to obtain an optimum design.

OBJECTS AND SUMMARY OF INVENTION

Accordingly, a primary object of the present invention is to provide a new and improved superconducting magnet coil joint which minimizes the electrical resistance of the joint.

Another object of the present invention is to provide a new and improved joint for a superconducting magnet in which the electrical resistance heating and power losses are minimized.

Still another object of the present invention is to provide a new and improved superconducting magnet coil joint which provides a high current carrying capacity, and which avoids quenching of the magnetic field.

In order to attain the above and related objectives, in carrying out the present invention in one form thereof, the ends of the ribbon conductors are bared and overlapped in a lap joint having a length in the order of 100 inches, with a flatted length of solder sandwiched between the ends. A heat source is brought into thermal contact with the lap joint to melt the solder and electrically connect the ends of the conductors by sliding the heat source along the lap joint while controlling the pressure of the heat source against the lap joint, controlling the temperature of the heat source, and controlling the speed of movement of the heat source along the lap joint to provide a uniform low electrical resistance joint. A solder flux is utilized and the temperature of the heat source is maintained in the order of 200° C. In one embodiment of the invention the heat source is on a cantilevered support, and in an alternate embodiment wheels are provided on the heat source to guide the heat source over the lap joint. The heat source may include a reflective housing with a quartz member adjacent the lap joint and with a reflective coating inside the housing to focus the heat on the lap joint. The ribbon conductors are held in tension on the coil form during the soldering process.

BRIEF DESCRIPTION OF THE DRAWINGS

FIG. 1 is a simplified diagrammatic showing of the present invention.

FIG. 2 shows details of the heating source suitable for use in FIG. 1.

FIG. 3 shows a cross section of a lap joint produced by the apparatus of FIGS. 1 and 2.

FIG. 4 is a grass sectional side view of FIG. 3.

FIG. 5 shows an alternate embodiment heat source suitable for use with FIG. 1 and including a resistance heater.

FIG. 6 is a side view of FIG. 5 taken along the lines 6—6 of FIG. 5.

Referring first to FIG. 1. Magnet bore 10 is formed within the magnet coil support structure, which includes a composite drum 12 manufactured using resin-impregnated strands of glass fiber rovings wound around a mandrel and wetted with epoxy, after which the drum is cured, machined and extracted from the mandrel. A series of main magnet coils, such as 3 and 4, are wound circumferentially around the outer surface of composite drum 12 about axis 6 of the assembly by rotating the drum by suitable means such as electric motor 8 connected to shaft 14 by a suitable drive mechanism, indicated generally as 11. Drive mechanism 11 may conveniently be a belt and pulley drive or a gear drive, causing rotation of drum 12 in the direction shown by arrows 15. End 16 of a ribbon conductor of suitable material, such as niobium titanium, is wound from spool or bobbin 17 rotatably supported about shaft 18 by securing the end 16 to drum 12 and rotating the drum by electric motor 8 and drive 11, forming the magnet coils such as 3 and 4 about the surface of drum 12.

The present invention enables the low electrical resistance joining or connection of a conductor from a replacement spool or bobbing in place of spool 17 after the conductor on spool 17 has been used up in partially winding a main magnet coil such as 3 and 4, or alternatively can be used in the series connection between separate coils such as 3 and 4.

The use of the present invention in connecting the ends of magnet coils 3 and 4 in series in the region 21 between the magnets is illustrated in FIGS. 1-3. Referring to FIGS. 1-3, heat source assembly 25 includes linear bearing support 30 movable along support shaft 31, with a heat or soldering head 26 selectively positioned within diagonal groove 23 in composite drum 12 and extending between main magnet coils 3 and 4. Heat source assembly 25 is pivotally supported about shaft 33 and includes spring or tension means 34, which is adjustable to control the pressure of soldering head 26 against, or in the direction of, support drum 12.

Heat source assembly 25 includes internal heating element or heat source 40 within housing 28, which may be elliptically or parabolically shaped by curved walls 29 to focus the heat generated by the heat source within the generally bell-shaped housing 28 to and through quartz plate 43 at the open end. The interior of curved walls 28 are plated with gold or aluminum to assist in the heat reflection. The quartz plate 43 is retained in position by retaining means or clips 44, and includes a rectangular projection or head 26 dimensioned to fit within groove 23 in the surface of drum 12 extending between main magnet coils 3 and 4 at an angle to axis 6 of the drum. To facilitate movement of the heat source assembly 25 along groove 23 on drum 12, one or more wheels 50 may be rotatably mounted on shaft 49 secured to housing 28. It is to be noted that heat source assembly 25 is supported in a cantilevered fashion about shaft 33 such that the weight of the heat source assembly 25 applies pressure through head 26, which pressure may be adjusted by selection or adjustment of spring 34, to provide the desired pressure to the conductors which are to be electrically connected within groove 23. Movement or sliding of heat source assembly 25 is controlled by controlling the slow angular rotation of support drum 12 which also drives heat source assembly 25 along support shaft 31 in cooperation with linear bearing support 30.

As best shown in FIGS. 3 and 4, the end 54 of the conductor forming main magnet coil 3 is positioned within groove 23 of drum 12 to overlap the beginning or first end of the conductor 56, which forms main magnet coil 4, and the two are separated by flatted solder 57 sandwiched between the conductor ends. The length of the lap joint formed by the sandwich 54, 56 and 57 is in the order of 100 inches, in order to assist in minimizing the electrical resistance of the lap joint formed by the sandwich. Prior to placing conductor ends 54 and 56 in groove 23 the conductor ends are bared, after which a thin solder coating 59 is formed on the conductor ends by dipping the conductor ends in a solder bath. The flatted solder 57 is good quality rosin core solder which has been flatted to the width of ribbon conductors 54 and 56 (in the order of 0.12 inches wide), and which is approximately 0.015 inches thick. The conductor ends 54 and 56 within groove 23 are maintained in tension (in the order of one pound of tension) and are secured in position within groove 23 during the soldering by being taped in place on drum 12.

The resistance of the lap solder joint 60 formed is kept to a minimum and the quality of the joint maintained along the relatively long (100-inch) joint by control of the pressure and temperature of soldering head 26 against conductor ends 54 and 56, and also through control of the speed of movement or sliding of soldering head 26 along the lengthy lap joint formed between the conductor ends 54 and 56. The temperature of the soldering head 26 is maintained at 200° C. ±10° C. by temperature sensor and controller 27 (see FIG. 1), which senses and controls the electrical power provided to the heating element or heat source 40. Solder 57, which has been found suitable, is electrical solder 60/40, that is, 60% lead and 40% tin with a central rosin flux core and is initially of a circular cross section. Solder 57 is flattened to a width corresponding to the width of conductors 54 and 56 before being sandwiched between the conductors. A suitable speed for the movement of the soldering head 26 along the lap joint 54, 56 and 57 is in the order of 15 inches per minute.

The heating element or heat source 40 may be a quartz lamp, as shown schematically in FIG. 2, or alternatively an electrical resistance element, is described below in connection with FIGS. 5 and 6. The use of radiant energy through a quartz lamp provides heat waves which are readily reflected onto the lap joint 54, 56 and 57 by the aluminum or gold plating inside curved walls 29. Curved walls 29 may be elliptical or parabolical in shape, to better focus the radiant energy at the open end on quartz plate 43 and soldering head 26, particularly if the quartz lamp extends along the axis or focal point 41 of the curve 29. Wheels 50 on heat source assembly 25 are optional.

FIGS. 5 and 6 show an alternate embodiment of heat source assembly 25. Referring to FIGS. 4 and 5, heat source assembly 125 includes a resistive heating element 140 positioned within copper housing 128, with electrical power supplied to the heating element through power input leads 121 and 122. Longitudinally extending soldering head 126 is dimensioned to fit within groove 23 of drum 12 and one or more guide wheels 150 rotatably supported by axle 142 also fit within the groove. Heat source assembly 125 is supported on support structure 108 consisting of a plurality of horizontal members such as 110 and vertical members such as 112, with heat source assembly 125 adjustably supported by heat source assembly support members 130. Threaded adjustment members 131 enable selective adjustment of the pressure applied by soldering head 126 against sandwich lap joint 54, 56 and 57 (see FIGS. 3 and 4). Heat source assembly 125 is pivotally mounted about axle or axis 143 to enable soldering head 126 to adjust to the curvature of drum 12. The positioning of wheel 150 within groove 23 can be adjusted by screw 135 which supports vertical members 112 through threaded aperture 136, which in turn support axle 142.

While the present invention has been described in connection with the provision of long lap soldered joints on cylindrical drum 12 of an MRI superconducting magnet assembly, conductor ends 54 and 56 may conveniently be soldered on a flat or other work surface or table (not shown) adjacent to drum 12, and the soldered conductors subsequently wound on the drum. This procedure can be effectively utilized, for example, when the conductor 16 from bobbin 17 is exhausted prior to completion of the winding of a main magnet coil such as 3 and 4. Under such circumstances, a conductor from a replacement bobbin must be joined to the portion of the magnet coil already wound in order to finish the coil. The joint can be formed within a groove on a work table if desired. The speed of movement of heat source assembly 25 or 125 over lap joint 54, 56 and 57 so formed may be conveniently controlled through use of the speed control associated with motor 8, as is done when the lap joint is formed directly on drum 12 within groove 23.

Use of the present invention results in the formation of good quality low resistance lap joints achieved by controlling and adjusting the soldering head 26 temperature, contact pressure between the soldering head and the superconductor lap joint 54, 56 and 57 and control of the speed of movement of the soldering head through control of the rotational speed of drum 12. Long lap joints in the order of 100 inches or more can be readily and uniformly fabricated with reliable and uniform low resistance in the order of less than $1 \times 100^{-10}$ ohms. This is to be compared with a well made manual lap solder joint, which typically may have a resistance in the order of $1-5 \times 10^{-8}$ ohms per inch of length. Moreover, it has been found that lap joints formed by the present invention provide suitable thermal, electrical, magnetic and mechanical characteristics for use in MRI superconducting magnets. The present invention has thus been proved to be thermally, mechanically and electrically efficient in the presence of extreme temperature variations or gradients.

While the present invention has been described with respect to certain preferred embodiments thereof, it is to be understood that numerous variations in the details of construction, the arrangement and combination of parts, and the type of materials used may be made without departing from the spirit and scope of the invention.

What we claim is:

1. A method of producing long low resistance solder lap joints suitable for use on superconducting magnet coils comprising the steps of:
   securing a first end of a first ribbon conductor to a support;
   rotating said support to wind said conductor into a coil about said support providing a second end of said conductor;
   baring a length of said second end of said first conductor;
   baring a length of a first end of a second conductor;
   sandwiching said second end of said first conductor and said first end of said second conductor on either side of a flatted length of solder to form a lap joint;
   bringing a heat source into thermal contact with said lap joint to melt said solder and electrically connect said second end of said first conductor to said first end of said second conductor;
   moving said heat source along said lap joint while controlling the pressure of said heat source against said lap joint and controlling the temperature of said heat source; and
   controlling the speed of the movement along said lap joint to provide a uniform low electrical resistance joint.

2. The method of producing low resistance solder lap joints of claim 1 wherein said solder includes a flux.

3. The method of producing low resistance solder lap joints of claim 2 wherein said solder is 60/40 solder with a rosin core, and is flattened to substantially the same width as said first and second conductors prior to being sandwiched between said conductors.

4. The method of producing low resistance solder lap joints of claim 3 wherein said second end of said first conductor and said first end of said second conductor are solder plated in a solder bath before said length of solder is sandwiched therebetween.

5. The method of producing low resistance solder lap joints of claim 1 wherein said temperature is maintained in the order of 200° C.

6. The method of producing low resistance solder lap joints of claim 5 wherein said lap joint is in the order of 50-100 inches long.

7. The method of producing low resistance solder lap joints of claim 6 wherein said first and second conductors are $Nb_3Sn$.

8. The method of producing low resistance solder lap joints of claim 5 wherein said control of speed is accomplished by controlling the speed of rotation of said support.

9. The method of producing low resistance solder lap joints of claim 8 wherein said heat source is supported against the sandwiched lap joint in a cantilevered fashion.

10. The method of producing low resistance solder lap joints of claim 1 wherein at least one wheel on said heat source rotates within a groove on said support between adjacent coils on said support to guide said heat source over said lap joint.

11. The method of producing low resistance solder joints of claim 10 wherein said groove is at an angle to said axis of said support, and said heat source is mounted on a linear bearing to enable axial movement of said heat source within said groove.

12. The method of producing low resistance solder lap joints of claim 11 wherein said heat source includes a quartz lamp positioned within a reflector to focus heat on said lap joint.

13. The method of producing low resistance solder lap joints of claim 12 wherein said reflector includes an end remote from said reflector adjacent to said lap joint, and a quartz member closing said end.

14. The method of producing low resistance solder lap joints of claim 4 wherein said lap joint is temporarily secured with said conductors in tension prior to bringing said heat source into thermal contact with said lap joint.

15. The method of producing low resistance solder lap joints of claim 14 wherein said tension is in the order of one pound.

* * * * *